US009118495B1

(12) United States Patent
Hankins et al.

(10) Patent No.: US 9,118,495 B1
(45) Date of Patent: Aug. 25, 2015

(54) COMMUNICATION BETWEEN BROADCAST DOMAINS

(75) Inventors: Scott Andrew Hankins, Cupertino, CA (US); Andrew John Mastracci, San Jose, CA (US); Edward G. Bruck, Kelowna (CA)

(73) Assignee: Pertino, Inc., Los Gatos, CA (US)

( * ) Notice: Subject to any disclaimer, the term of this patent is extended or adjusted under 35 U.S.C. 154(b) by 0 days.

(21) Appl. No.: 13/543,729

(22) Filed: Jul. 6, 2012

(51) Int. Cl.
*H04L 12/28* (2006.01)

(52) U.S. Cl.
CPC ...................................... *H04L 12/28* (2013.01)

(58) Field of Classification Search
CPC .................. H04L 12/4641; H04L 12/4633
USPC ........................................ 370/394, 254, 252
See application file for complete search history.

(56) References Cited

U.S. PATENT DOCUMENTS

| 5,548,646 | A | 8/1996 | Aziz et al. |
| 6,457,061 | B1 | 9/2002 | Bal et al. |
| 7,447,166 | B1 * | 11/2008 | Kaluve et al. ................. 370/254 |
| 7,774,837 | B2 | 8/2010 | McAllister |
| 7,961,725 | B2 | 6/2011 | Nagarajan et al. |
| 8,036,664 | B2 | 10/2011 | Khetawat et al. |
| 8,150,397 | B2 | 4/2012 | Khetawat et al. |
| 8,159,986 | B2 | 4/2012 | Yun et al. |
| 8,204,502 | B2 | 6/2012 | Khetawat et al. |
| 8,228,818 | B2 | 7/2012 | Chase et al. |
| 8,327,437 | B2 | 12/2012 | McAllister |
| 8,477,775 | B2 | 7/2013 | Choudhary et al. |
| 2003/0200295 | A1 | 10/2003 | Roberts et al. |
| 2005/0154790 | A1 | 7/2005 | Nagata et al. |
| 2007/0121565 | A1 | 5/2007 | Halasz et al. |
| 2009/0106394 | A1 | 4/2009 | Lin et al. |
| 2009/0138620 | A1 * | 5/2009 | Johnson et al. ............... 709/246 |
| 2010/0061288 | A1 | 3/2010 | Yun et al. |
| 2010/0061724 | A1 * | 3/2010 | Sun .................................. 398/45 |
| 2010/0180014 | A1 | 7/2010 | Kannan et al. |
| 2010/0290398 | A1 | 11/2010 | Choudhary et al. |
| 2011/0162060 | A1 * | 6/2011 | Vijayakumar et al. .......... 726/13 |
| 2012/0315882 | A1 * | 12/2012 | Chang et al. ............... 455/414.1 |
| 2013/0182712 | A1 | 7/2013 | Aguayo et al. |
| 2014/0040750 | A1 | 2/2014 | B. et al. |
| 2014/0112343 | A1 | 4/2014 | Lambeth et al. |

OTHER PUBLICATIONS

Aerohive Networks, "Aerohive Demonstrates Industry First Bonjour Gateway to Enable Apple AirPlay and Apple AirPrint Across Multi-Subnet Enterprise Networks," Sunnyvale, CA, Mar. 5, 2012, 3 Pages.
U.S. Appl. No. 13/675,552, filed Nov. 13, 2012, 66 Pages.
U.S. Appl. No. 13/675,552 / Filing Receipt and Notice to File Corrected Application Papers, Mailed Dec. 12, 2012, 5 Pages.
U.S. Appl. No. 13/675,552 / Applicant Response to Pre-Exam Formalities Notice, Mailed Jan. 3, 2013, 10 Pages.
U.S. Appl. No. 13/675,552 / Filing Receipt, Mailed Jan. 11, 2013, 3 Pages.
U.S. Appl. No. 13/675,552 / Preliminary Amendment, Mailed Apr. 2, 2013, 4 Pages.
U.S. Appl. No. 13/747,371, filed Jan. 22, 2013, 76 Pages.

(Continued)

*Primary Examiner* — Man Phan
*Assistant Examiner* — Mewale Ambaye
(74) *Attorney, Agent, or Firm* — Berkeley Law & Technology Group, LLP (57) ABSTRACT

Briefly, in accordance with an embodiment, communication between broadcast domains is described.

56 Claims, 4 Drawing Sheets

(56) References Cited

OTHER PUBLICATIONS

U.S. Appl. No. 13/747,371 / Notice to File Missing Parts and Filing Receipt, Mailed Feb. 15, 2013, 5 Pages.
U.S. Appl. No. 13/747,371 / Application Data Sheet, Mailed Mar. 13, 2013, 5 Pages.
U.S. Appl. No. 13/747,371 / Notice to File Missing Parts, Mailed Apr. 1, 2013, 22 Pages.
U.S. Appl. No. 13/747,371 / Applicant Response to Pre-Exam Formalities Notice, Mailed Jun. 3, 2013, 16 Pages.
U.S. Appl. No. 13/747,371 / Filing Receipt, Mailed Jun. 13, 2013, 3 Pages.
U.S. Appl. No. 13/802,529, filed Mar. 13, 2013, 81 Pages.
U.S. Appl. No. 13/802,529 / Notice to File Missing Parts and Filing Receipt, Mailed Apr. 23, 2013, 5 Pages.
U.S. Appl. No. 13/802,529 / Applicant Response to Pre-Exam Formalities Notice, Mailed May 10, 2013, 9 Pages.
U.S. Appl. No. 13/802,529 / Filing Receipt, Mailed May 20, 2013, 3 Pages.
U.S. Appl. No. 13/802,529 / Non-Final Office Action, Mailed Jul. 22, 2014, 17 Pages.
U.S. Appl. No. 13/829,611, filed Mar. 14, 2013, 83 Pages.
U.S. Appl. No. 13/829,611 / Notice to File Missing Parts and Filing Receipt, Mailed May 2, 2013, 5 Pages.
U.S. Appl. No. 13/829,611 / Applicant Response to Pre-Eam Formalities Notice, Mailed Jun. 7, 2013, 5 Pages.
U.S. Appl. No. 13/829,611 / Filing Receipt, Mailed Jul. 9, 2013, 3 Pages.
U.S. Appl. No. 13/831,306, filed Mar. 14, 2013, 88 Pages.
U.S. Appl. No. 13/831,306 / Notice to File Missing Parts and Filing Receipt, Mailed May 6, 2013, 5 Pages.
U.S. Appl. No. 13/831,306 / Applicant Response to Pre-Exam Formalities Notice, Mailed Jun. 27, 2013, 6 Pages.
U.S. Appl. No. 13/831,306 / Filing Receipt, Mailed Jul. 9, 2013, 3 Pages.
U.S. Appl. No. 13/844,254, filed Mar. 15, 2013, 99 Pages.
U.S. Appl. No. 13/844,254 / Notice to File Missing Parts and Filing Receipt, Mailed May 9, 2013, 5 Pages.
U.S. Appl. No. 13/844,254 / Applicant Response to Pre-Exam Formalities Notice, Mailed Jun. 27, 2013, 5 Pages.
U.S. Appl. No. 13/844,254 / Filing Receipt, Mailed Jul. 9, 2013, 3 Pages.
Williams, "Pertino Offers a Cloud-Based Network, No Hardware Required," Feb. 12, 2013, www.techcrunch.com, 3 Pages.
U.S. Appl. No. 13/675,552 / Non-Final Rejection, Mailed Oct. 30, 2014, 18 Pages.
U.S. Appl. No. 13/675,552 / Amendment/Req. Reconsideration After Non-Final Rejection filed Mar. 2, 2015, 21 pages.
U.S. Appl. No. 13/747,371 / Non-Final Rejection mailed Mar. 2, 2015, 24 pages.
U.S. Appl. No. 13/802,529 / Amendment/Req Reconsideration After Non-Final Reject, Filed Nov. 5, 2014, 28 Pages.
U.S. Appl. No. 13/802,529 / Final Rejection mailed Feb. 19, 2015.
U.S. Appl. No. 13/675,552: Final Rejection, mailed Jun. 8, 2015, 19 pages.
U.S. Appl. No. 13/829,611: Non-Final Rejection, mailed Jun. 16, 2015, 14 pages.
U.S. Appl. No. 13/831,306: Non-Final Rejection, mailed Jun. 25, 2015, 13 pages.

\* cited by examiner

COMMUNICATION BETWEEN BROADCAST DOMAINS

FIELD

The present application relates to communication between two or more broadcast domains, particularly at a network protocol level.

BACKGROUND

Various advancements in networking address interoperability of one or more devices across one or more networks. Two different physical networks may communicate via a network device. A network device, such as a router, may create a hardware bridge between two networks. Additionally, a remote device, such as a device on a remote network, for example, may communicate with a local network by executing a virtual private network (VPN), typically by executing a software program. VPN software may create a reasonably secure channel of communication between a remote device and local network and may route traffic to the remote device. This may allow the remote device to communicate with the local network as if the remote device were physically part of the local network, rather than remote.

Although physically connecting a network via a hardware bridge is done, there may be several drawbacks. First, a hardware bridge does not typically include the capability of interoperating via higher levels of a network protocol. A network protocol refers to a set of signaling conventions for the purposes of a communications network governing interoperation or communications between devices that comply with the protocol. Typically, a network protocol has several layers. These layers are referred to as a communication stack. Various types of communications occur across various layers. As one moves higher in this communication stack, additional functions may be available by transmitting communications that are compatible or compliant with the network protocol at these higher layers. Therefore, for example, a hardware bridge usually cannot forward signal packets since it operates at a layer of the communication stack that does not provide that capability. However, typically, using the network protocol layer, and higher layers (not discussed herein), a user may, for example, effect device communication permissions, user communication permissions, etc. Because a hardware bridge does not operate at the network protocol level, typically, there is little user control for higher layer functions.

A second drawback of a hardware bridge is that it may be difficult to setup or modify without specialized skills and/or experience. Furthermore, making changes at a hardware layer may noticeably affect performance of a network.

A VPN may enable a remote device to communicate via a local network, but has its own drawbacks. A router may allow communications from a remote device to a VPN server on a local network. A remote device may be authenticated and the VPN server may create a special route between the local network and the remote device. However, a route may be created and re-created if the remote device is power cycled. Also, a VPN typically only affects a single remote device.

BRIEF DESCRIPTION OF THE DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth to provide a thorough understanding of claimed subject matter. However, it should be apparent to one skilled in the relevant art having benefit of this disclosure that claimed subject matter may be practiced without specific details. In other instances, well-known features are omitted and/or simplified so as not to obscure claimed subject matter. While certain features have been illustrated and/or described herein, many modifications, substitutions, changes and/or equivalents may occur to those skilled in the art. It is, therefore, to be understood that the appended claims are intended to cover all such modifications and/or changes as fall within the true spirit of claimed subject matter.

Reference throughout this specification to one implementation, an implementation, one embodiment, an embodiment, or the like may mean that a particular feature, structure, or characteristic described in connection with a particular implementation or embodiment may be included in at least one implementation or embodiment of claimed subject matter. Thus, appearances of such phrases in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, the particular context of the description or usage of these terms may provide helpful guidance regarding inferences to be drawn for that particular context.

Operations and/or processing involve physical manipulations of physical quantities. Typically, although not necessarily, these quantities may take the form of electrical or magnetic signals capable of being stored, transferred, combined, compared or otherwise manipulated. It has proven convenient, at times, principally for reasons of common usage, to refer to these signals as bits, data, values, elements, symbols, characters, terms, numbers, numerals or the like. It should be understood, however, that all of these or similar terms are to be associated with appropriate physical quantities and are intended to merely be convenient labels.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices, including, for example, one or more illustrative examples.

In this context, the term network device refers to any device capable of communicating via and/or as part of a network. Network devices may be capable of sending or receiving signals (e.g., signal packets), such as via a wired or wireless network, or may be capable of performing arithmetic or logic operations, processing or storing signals, such as in memory as physical memory states, and may, for example, operate as a server. Network devices capable of operating as a server, or otherwise, may include, as examples, dedicated rack-mounted servers, desktop computers, laptop computers, set top boxes, integrated devices combining two or more features of the foregoing devices, the like or any combination thereof.

A network may comprise two or more network devices and may couple network devices so that signal communications, such as in the form of signal packets, for example, may be exchanged, such as between a server and a client device or other types of network devices, including between wireless devices coupled via a wireless network, for example.

A network may also include now known, or to be later developed derivatives, improvements, including, for example, past, present or future mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, other connections, or any combination thereof. Likewise, sub-networks, such as may employ differing architectures or may be compliant or compatible with differing protocols, such as communication protocols (e.g., network communication protocols), may interoperate within a larger network. Various types of network devices may be made available so that device interoperability is enabled and, in at least some instances, may be transparent to the devices. In this context, the term transparent refers to network devices communicating via a network in which the devices are able to communicate via intermediate network devices, but without the communicating devices necessarily specifying one or more intermediate devices and/or may include communicating as if intermediate devices are not necessarily involved in the communication transmissions. For example, a router may provide a link between otherwise separate and/or independent LANs.

The Internet refers to a decentralized global network of interoperable networks. The Internet includes local area networks (LANs), wide area networks (WANs), wireless networks, or long haul public networks that, for example, allow signal packets to be communicated between LANs. Signal packets may be communicated between nodes of a network, where a node may comprise one or more network devices, for example. As an illustrative example, but without limitation, a node may comprise one or more sites employing a local network address. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may route the signal packet in accordance with a target address and availability of a network path to the target address.

A network may be very large, such as comprising thousands of nodes, millions of nodes or even billions of nodes, as examples. As the number of network devices communicating via a network grow, signal transmissions via the network, such as in the form of signal packets, for example, may begin to interfere. Although a router may link otherwise independent LANs, a router may also provide some limits on signal packet communications to a select set of devices, for example. A router may limit signal packet communications by creation of a local broadcast domain (also referred to as BD or as a broadcast domain). In this context, the term broadcast domain refers to a set of devices, including associated services and/or support, occupying a local address space in which any device is able to communicate with any other device in the broadcast domain without employing a router or similar device capable of performing network address translation so that signal packets from within the BD may be forwarded to outside the BD or vice-versa. Using a router or a similar device able to perform network address translation, logical portions of networks may be separate and independent such that transmissions in the form of signal packets by a network device on a network are not forwarded from the BD unless a destination having the particular destination address of the signal packet transmission exists outside the local broadcast domain. This type of approach effectively creates logical independent and separate (e.g., non-overlapping) divisions of a network referred to here as broadcast domains.

A broadcast domain may also be referred to as a logical broadcast domain. A logical broadcast domain may include a virtual broadcast domain or a non-virtual broadcast domain. A non-virtual broadcast domain refers to a broadcast domain that includes a set of physical devices, such as a router, a computing platform that includes a computing device, a network device, etc. A virtual broadcast domain, however, refers to a logical broadcast domain in which the logical boundary of the broadcast domain is not limited or associated with any particular physical devices and/or may be logically independent of physical devices, for example. The term broadcast domain is also used in a generic sense meaning that it is not limited to broadcast type of signal packet transmissions and may include in addition and/or in place of a broadcast, other types of signal packet transmission schemes, such as, but not limited to, anycast, broadcast, multicast, unicast, geocast, the like, or any combinations thereof.

As previously indicated, a network device comprises any device capable of communicating via a network. For example, network devices may comprise computing devices, non-computing devices, or other devices. For example, a network device may comprise a router, gateway, hub, switch, host, mobile device, server, client, the like, or any combinations thereof.

A server may comprise a network device capable of serving content. For example, a server may provide now known or to be later developed, derivatives, improvements, including past, present, or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, or the like, which may be processed in the form of physical signals, such as electrical signals, for example, or may be stored in memory, as physical states, for example.

As indicated above, a broadcast domain refers to at least a logical division of a network comprising a plurality of network devices such that network devices communicating via the logical division of the network may communicate with other network devices communicating via the logical division without use of a router or other network device capable of performing network address translation for addresses outside the broadcast domain. For example, as a non-limiting illustration, a single broadcast domain may be constructed using multiple repeaters, hubs, or switches, whereby a network device communicating via one of the multiple repeaters, hubs, or switches may communicate with another network device communicating via one of the repeaters, hubs, or switches.

In this context, the term broadcast domain configuration refers to various hardware devices, firmware, and/or software applications (if residing in one or more locations within the BD so as to be capable of being accessed or executed electronically) supporting a broadcast domain. As used in this specification, a broadcast domain configuration, therefore, may include stored signal packets relating to one or more features of a broadcast domain, such as representing, characterizing or specifying information related to one or more features, or other stored information relating one or more features of a network device communicating via the broadcast domain, such as to represent, to characterize or to specify the one or more features.

For example, a broadcast domain configuration may include a subset of, or additions to the following non-limiting illustrative examples of features: one or more network protocols, available addresses, used addresses, topology, devices used, such as switches or hubs, historical settings, such as for security, for a network protocol, etc., modifications of the foregoing, user accounts, including status, authentication, etc., security settings of the broadcast domain, workgroup or domain names, device names including status, available device features, etc., services available or used, status of the network devices, as well as other features.

One might attempt to address drawbacks of hardware bridges and/or VPN software, previously discussed, by forwarding signal packets from one broadcast domain to another broadcast domain. However, merely forwarding signal packets without more, such as signal processing or device architecture modifications or adjustments, for example, may add network complexity, traffic and/or expense and, therefore, may not necessarily address such drawbacks in a satisfactory manner.

Instead, however, in one example illustrative embodiment, use of a discovery device and a reflecting device, may allow network devices communicating via their respective broadcast domains, for example, to discover and request services available via network devices while still communicating via remote broadcast domains and potentially with less complexity, traffic or expense than simply implementing signal packet forwarding. In one possible illustrative embodiment, a controller may manage a plurality of respective discovery and reflecting devices communicating via their respective broadcast domains. In still another possible embodiment, a controller may provision one or more tunnel servers, for example, to facilitate communications between network devices communicating as part of different broadcast domains. Likewise, in still another illustrative embodiment, a controller may comprise a master controller that may be used to manage other controllers, for example, although there may, of course, be more than one or even several master controllers in a particular embodiment.

For example, in an embodiment, a discovery device may comprise a network device capable of communicating as part of a broadcast domain to discover features of the particular broadcast domain without human intervention, such as, for example, the previously described features, to generate a broadcast domain configuration of the particular broadcast domain. A discovery device may engage in a variety of activities to accomplish this including, but not limited to any of the following: passively monitoring signal packets, actively probing other network devices, port scanning other network devices, querying other network devices, querying servers, such as a domain controller or other server responsible for a directory of broadcast domain features, any combinations thereof, or other approaches. In this context, without human intervention indicates that processes may be executed without human intelligence being on hand or otherwise available to make appropriate adaptations or changes, such as, if unanticipated events take place, for example. One or more processes may execute satisfactorily to accomplish a particular result, for example, without such human intelligence, interaction or direction. Thus, in a sense, processes may be performed automatically, so to speak.

Figure 2:
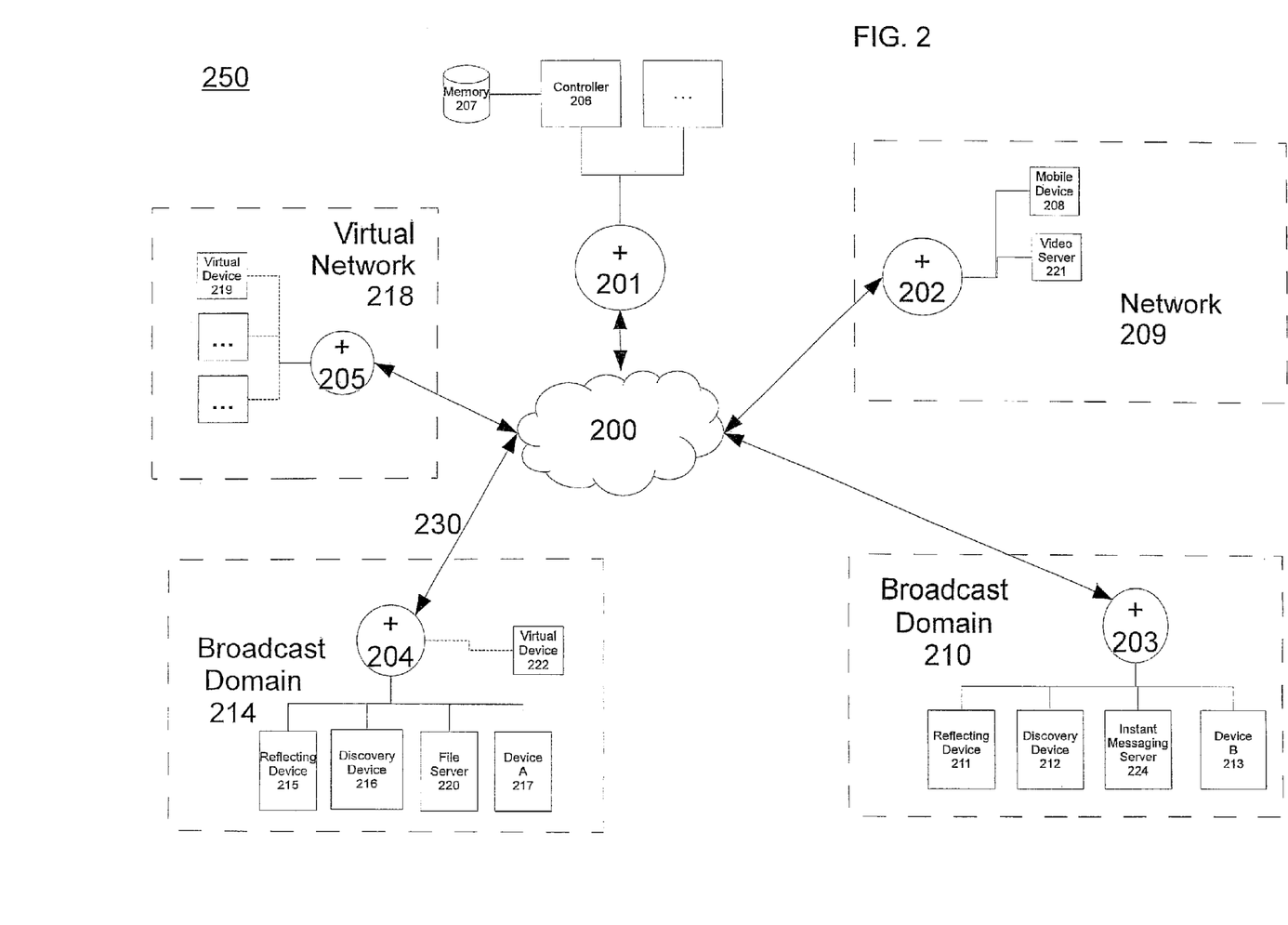
FIG. 2 is a schematic diagram illustrating another embodiment of communication between broadcast domains.

Industry software applications may also assist in generating a broadcast domain configuration. For example, Nmap, a GNU software program, written by Gordon Lyon (also known by his pseudonym Fyodor Vaskovich) and available for download, for example, at the website www.nmap.org, comprises network scanner software capable of discovering hosts and/or services on a broadcast domain. Nmap may be executed by a computing or a network device to send network transmissions in the form of signal packets to hosts on a broadcast domain and may evaluate received response packets. Nmap is at least capable of discovering a host operating system, names and versions of available services, estimated uptime, hardware parameters and/or other network parameters. As illustrated in FIG. 2, a discovery device 216, for example, as described herein, may discover a broadcast domain configuration parameter using Nmap or any other software application capable of similar discovery.

Referring to FIG. 2, a broadcast domain configuration may be generated by a discovery device 216 monitoring discovery signal packets via a broadcast domain 214. A discovery device 216 may also passively monitor signal packets that may comprise information relative to a broadcast domain configuration. Discovery device 216 may also actively probe one or more devices, such as communicating as part of broadcast domain 214 or addressable via broadcast domain 214. For example, discovery device 216 may port scan another device communicating as part of broadcast domain 214, or use a software application capable of accomplishing such a task, for example. In this context, a domain controller refers to a network device that is capable of responding to security authentication requests on a broadcast domain. A discovery device may request broadcast domain configuration parameters from a domain controller or other network device capable of maintaining a directory of broadcast domain configuration parameters. For example, device A 217 may comprise an active directory server, and discovery device 216 may query active directory server 217 by transmitting signal packets requesting a response comprising discovery signal information.

Likewise, in another embodiment, available services via a network device may be determined based at least in part on which ports are open on a network device. Port scanning a network device may determine which ports may be open by transmitting signal packets to request a connection with a network device on a port. A network device may respond, for example, by transmitting signal packets indicating an available connection. See, for example, RFC 793—Transmission Control Protocol, available, for example, from the Internet Engineering Task Force (IETF), at www(dot)ietf(dot)org. Signal packets comprising responses may imply that a port may be available.

Because network port numbers may consistently map to known services, a network device monitoring these responses may at least in part discover which services may be available via other network devices. For example, an open port 20 or 21 may imply that an FTP service may be available. Additionally, SSH may be available via port 22, Telnet may be available via port 23, SMTP may be available via port 25, POP3 may be available via port 110, or HTTPS may be available via port 443, for example. As is known in the art, associations between port numbers and services may be consistent, or may change over time. As associations between port numbers and services evolve, it is intended that claimed subject matter include discovery of available services according to evolving industry standards.

As in known in the art, port scanning may be accomplished via TCP scanning, SYN scanning, UDP scanning, ACK scanning, Window scanning, FIN scanning, or other scanning types or methods, as may be known in the art or may later be developed.

In another illustrative embodiment, a reflecting device may comprises a network device capable of communicating as part a broadcast domain and capable of emulating a generated (e.g., other) broadcast domain configuration without human intervention, also illustrated in FIG. 2. In this context, the term emulate refers to software stored or capable of executing on a physical device in which, the software, if executed by a physical device, for example, would appear to another network device as a device other than the physical device that is executing the software. Emulation may include operating as a proxy, meaning to appear as another device that may exist or it may include appearing as a device that does not exist anywhere. Likewise, emulation may include appearing as an enhanced or augmented version of another device or as a more limited version of another device. Furthermore, the term device, unless specified to be a physical device may include a virtual device or an emulated device.

As previously indicated, without human intervention indicates that processes and/or operations may be executed without human intelligence being on hand or otherwise available to make appropriate adaptations or changes, such as, if unanticipated events take place, for example. One or more processes may execute satisfactorily to accomplish a particular result, for example, without such human intelligence, interaction or direction. Thus, in a sense, processes may be performed automatically, so to speak. In general, throughout this disclosure, it is understood that processes and/or operations described herein take place without human intervention, even if that is not explicitly stated, unless it is made expressly clear that human intervention or interaction is specifically intended to be employed.

In an embodiment, emulation may comprise, for example, a first network device simulating another network device via a broadcast domain. Another network device, in this example, may comprise a physical network device, or a virtual network device. Therefore, the emulated device may not exist as a physical piece of hardware. The emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a broadcast domain without forwarding requests to another network device. Additionally, emulation, in an embodiment, may comprise imitating another network device. However, another network device may exist virtually, and/or may comprise a set instructions being executed via another network device. Although services may appear to be available via a network device, the network device may, therefore, in an embodiment, comprise a virtual network device.

In a possible example embodiment, a reflecting device may receive signal packets from a discovery device communicating via a remote broadcast domain, which may comprise a broadcast domain configuration including features of a broadcast domain, such as those previously disclosed, for example. A reflecting device may forward signal packets via a local broadcast domain in a manner so as to emulate a generated broadcast domain configuration, such as the example illustrated by FIG. 1, discussed below.

Figure 1:
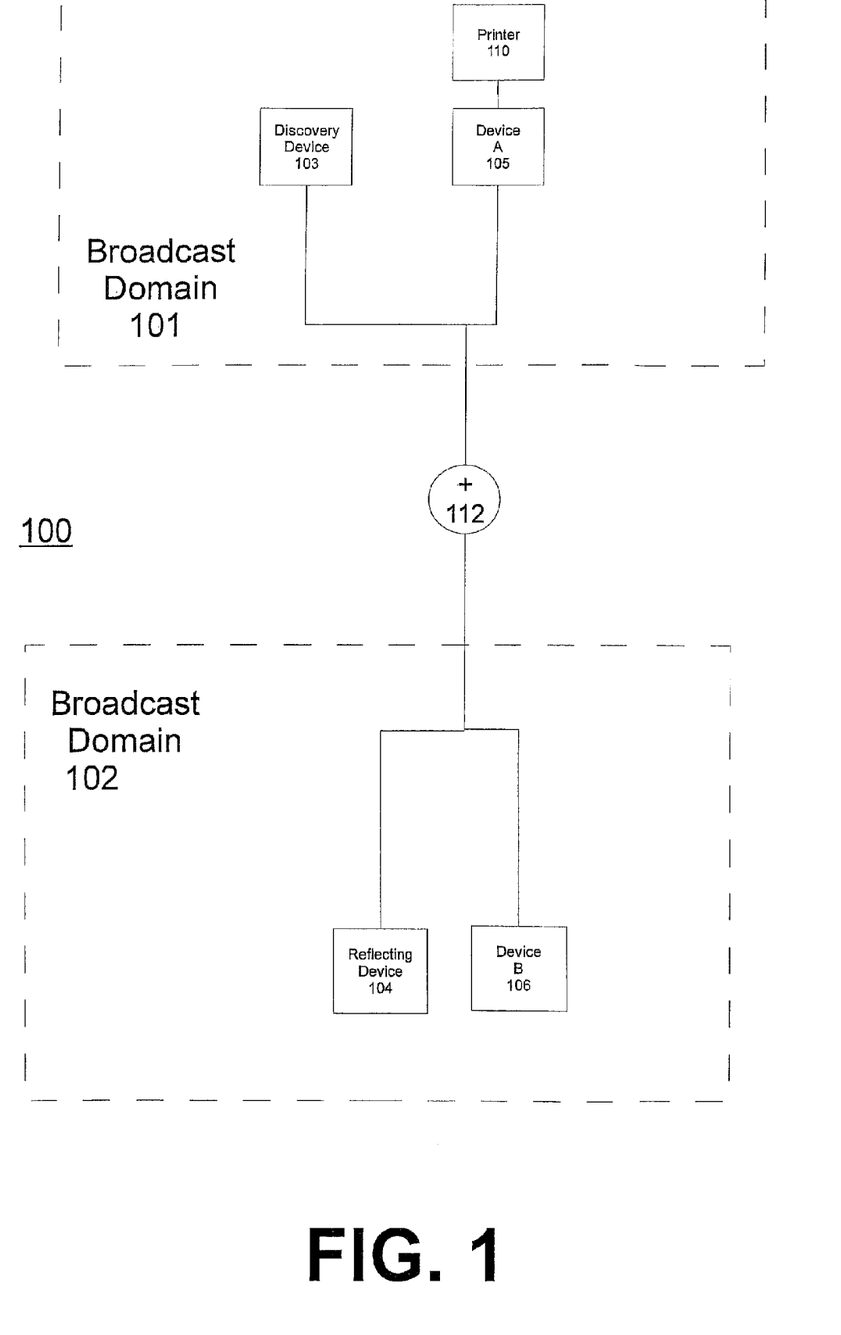
FIG. 1 is a schematic diagram illustrating an embodiment of communication between broadcast domains.

FIG. 1 is a diagram illustrating an embodiment 100 of communication between broadcast domains. A broadcast domain 101 may include a discovery device 103. Discovery device 103 may generate a broadcast domain configuration and may transmit the generated broadcast domain configuration to a reflecting device 104, which may be communicating as part of broadcast domain 102, for example. Discovery device 103 as part of generating a broadcast domain configuration may, for example, assemble without human intervention a list of devices capable of communicating via broadcast domain 101. Discovery device 103 may also assemble without human intervention a list of services available via broadcast domain 101 as well as other features of broadcast domain 101. A generated broadcast domain configuration may be communicated in a manner that includes a router 112 or that is transparent to router 112, depending at least in part on the particular embodiment or implementation, subsequently described in more detail.

A reflecting device 104 may receive a generated broadcast domain configuration and may emulate without human intervention the generated broadcast domain configuration on broadcast domain 102, for example, in the manner previously disclosed, although claimed subject matter is not limited in scope in this respect. A broadcast domain configuration having been generated and emulated on broadcast domain 102 may enable device B 106, communicating as part of broadcast domain 102, to discover device A 105, communicating as part of broadcast domain 101. Thus, in an embodiment, the BDs, for example, are not necessarily bridged. However, after discovering devices and communicating a generated broadcast domain configuration for broadcast domain 101, that is emulated, such as on broadcast domain 102, device B 106 may communicate with device A 105 and may request use of one or more services that may be provided by device A 105, such as, for example, described previously. For example, device A may share a printer 110 whereby device B 106 may print documents via device A 105, or may use any number of other services that may be included in the generated broadcast domain configuration.

A controller, such as a master controller, for example, may be used to manage discovery devices and reflecting devices. A controller or master controller may, for example, communicate with discovery devices and may transmit one or more signals, such as in the form of signal packet transmissions, for example, to a discovery device to initiate generation, transmission or ceasing such operations regarding one or more broadcast domain configurations, as well as other operations, described in more detail later. Likewise, a controller may, for example, instruct a reflecting device to initiate emulation or cease such operations regarding one or more broadcast domain configurations, as well as other operations, described in more detail later. In a network comprising more than two broadcast domains, a controller, for example, may initiate instructing discovery devices to send one or more generated broadcast domain configurations to one or more reflecting devices.

FIG. 2 is a diagram illustrating another embodiment 250 of communication between broadcast domains. A controller 206, for example, is illustrated. In one embodiment, a broadcast domain 214 may comprise a discovery device 216 and a reflecting device 215. Discovery device 216 may generate a broadcast domain configuration based at least in part on signal packets received via broadcast domain 214, such as discovery signal packets. In one example, without limitation, discovery device 216 may generate a broadcast domain configuration based at least in part on received signal packets comprising a multicast discovery protocol, such as NBT or NetBT, which refers to NetBIOS over TCP/IP. NBT is defined by the RFC 1001 and RFC 1002 available, for example, the Internet Engineering Taskforce (IETF), at www(dot)ietf(dot)org. NetBIOS provides three distinct services: name service for name registration and resolution, datagram distribution service for connectionless communication, and session service for connection-oriented communication. Generically, the term discovery signal packets or discovery packets refers to signal packets providing this or a similar discovery protocol type functionality or capability. Thus, discovery signal packets compliant or compatible with NBT, for example, may be referred to specifically as NBT packets or NBT signal packets. In another embodiment, WS-Discovery (Web Services Dynamic Discovery, OASIS, as described on the world wide web, for example, may be employed rather than NBT, for example. Thus, such signal packets may be referred to specifically as WS-discovery signal packets or WS-discovery packets. As yet another example, a discovery device may transmit Internet Control Message Protocol (ICMP) echo request signal packets (ICMP request packets) via a broadcast domain. A discovery device, for example, may monitor responses to ICMP request packets to determine reachability of one or more network devices communicating via a broadcast domain, for example.

Routers 201, 202, 203, 204, and 205 may route signal packets, such as between broadcast domains or to a controller, such as a master controller. Thus, a discovery device 216 may transmit a generated broadcast domain configuration to a controller or a master controller, such as 206. Controller 206 may store a generated broadcast domain configuration received from a discovery device, such as device 216, for example, using a memory device 207. Memory device 207 may comprise a local storage device or a non-local memory device otherwise accessible by controller 206, for example.

In another broadcast domain, such as 210, a reflecting device, such as 211, may request a generated broadcast domain configuration, such as from a controller. Likewise, alternatively, a reflecting device, such as 211, may request that a controller, such as a master controller, initiate one or more instructions for a discovery device, such as 216, to initiate transmission of a generated broadcast domain configuration, such as in the form of signal packet transmissions. Thus, for example, controller 206 may also initiate its own transmission of one or more generated broadcast domain configurations to reflecting device 211, such as in the form of signal packet transmissions. Reflecting device 211 may emulate a generated broadcast domain configuration, such as for broadcast domain 214, received from discovery device 216 or from controller 206, for example, on broadcast domain 210. Reflecting device 211 may also cease emulating a generated broadcast domain configuration, such as for broadcast domain 214 in this example, based at least in part on any one of the following: one or more instructions from a controller, such as controller 206, manual commands, such as may be entered via a device capable of affecting reflecting device 211, network congestion, network errors, or one or more features of a broadcast domain, such as those previously disclosed, any combination thereof, or others, for example.

Additionally, broadcast domain 210 may include discovery device 212. Discovery device 212 may generate a broadcast domain configuration and may transmit the generated broadcast domain configuration to a controller, such as controller 206, or to a reflecting device, such as 215. If the generated broadcast domain configuration, for example, is transmitted to controller 206, reflecting device 215 communicating as part of broadcast domain 214, for example, may request the generated broadcast domain configuration from controller 206 or controller 206 may initiate transmission of the generated broadcast domain configuration to reflecting device 215 with or without having received a request. Controller 206 may also initiate transmission, such as in the form of signal packets, for example, of a generated broadcast domain configuration, such as the broadcast domain configuration generated by discovery device 212, for example, via another broadcast domain, such as 214, for example. Thus, in one embodiment, for example, devices communicating via broadcast domain 214, and broadcast domain 210, may discover each other, communicate with devices communicating via other broadcast domains, and/or request services available via devices communicating via other broadcast domains, or via a controller, such as a master controller, for example. Of course, claimed subject matter is not limited in scope to example embodiments, such as the foregoing provided for illustrative purposes, for example.

In another illustrative embodiment, a device A 217, communicating via a broadcast domain 214, may discover and request services, such as from a video server 221, for example. A video server 221 may, for example, comprise a network device capable of communicating signal packets comprising a video signal. A video server 221 may, for example, have a capability to record video from a device capable of generating video, including storage in local memory, a capability to manage a directory of available video signals, a capability to edit stored videos, and/or a capability to transmit a stored video via a broadcast domain, such as in the form of signal packets, for example.

In one embodiment, mobile device 208 may, for example, comprise a discovery device. Video server 221 may be discovered by discovery device 208 and discovery device 208 may, for example, transmit a generated broadcast domain configuration to controller 206, for example. In another embodiment, if mobile device 208 also comprises a reflecting device, such as communicating via network 209, device 208 may discover and request files from a network device comprising file server 220 communicating, for example, as a part of broadcast domain 214.

Referring to FIG. 2, as previously discussed, a broadcast domain configuration may include devices communicating via a virtual private network (VPN), for example. In this context, a VPN refers to a mechanism in which a remote host connects to a VPN server in order to encrypt a communication stream in a manner so that the remote host is able to reasonably securely communicate with other devices of the broadcast domain and in which an intervening router has a configuration that allows the remote host to initiate the VPN even with network address translation being present. A device communicating via a VPN, such as virtual device 222, may connect to broadcast domain 214, or disconnect from broadcast domain 214. A discovery device 216, may update a generated broadcast domain configuration based at least in part on a communication state of virtual device 222, for example, and may forward an update, such as of a broadcast domain configuration, to a controller, such as 206, and/or to a reflecting device.

In another embodiment, discovery device 216 may initiate routing of a generated broadcast domain configuration. For example, discovery device 216 may initiate transmission of a generated broadcast domain configuration to a router that may forward the generated broadcast domain configuration, for example, to ultimately arrive at a controller, such as 206, or elsewhere. A controller, such as 206, may alternately, for example, access a generated broadcast domain configuration from storage 207, which may or may not be local. For example, this may be desirable if a controller 206 is reset, or otherwise reloads one or more generated broadcast domain configurations, for example. In another embodiment, controller 206 may create a broadcast domain configuration based at least in part on a stored (e.g., previously generated) broadcast domain configuration and modifications entered manually from an input device, such as a keyboard or mouse, for example. A generated broadcast domain configuration may, for example, be altered using modifications entered manually via an input device, such as a keyboard, for example, to a controller, such as 206, for example. In another embodiment, a broadcast domain configuration may be modified via manually entered changes effected via an input device, such as a mouse, at discovery device, such as 216, or at a reflecting device, for example.

In one embodiment, controller 206, may forward a generated broadcast domain configuration with or without receiving one or more initiating signals, such as from reflecting device 211. Thus, in an embodiment, for example, a controller, such as 206, may periodically, intermittently or asynchronously, etc., for example, forward one or more generated broadcast domain configurations based at least in part on currently communicating network devices, for example. Additionally, a linking table may specify forwarding rules or the like to, for example, create one or more associations, such as between broadcast domains, for example. In another embodiment, controller 206 may transmit a portion (e.g., digest or subset) of a generated broadcast domain configuration. For example, in an embodiment, a generated broadcast domain configuration may comprise a set of features for a broadcast domain 210 and controller 206, for example, may select a subset of features to forward, such as to one or more reflecting devices, for example.

Figure 3:
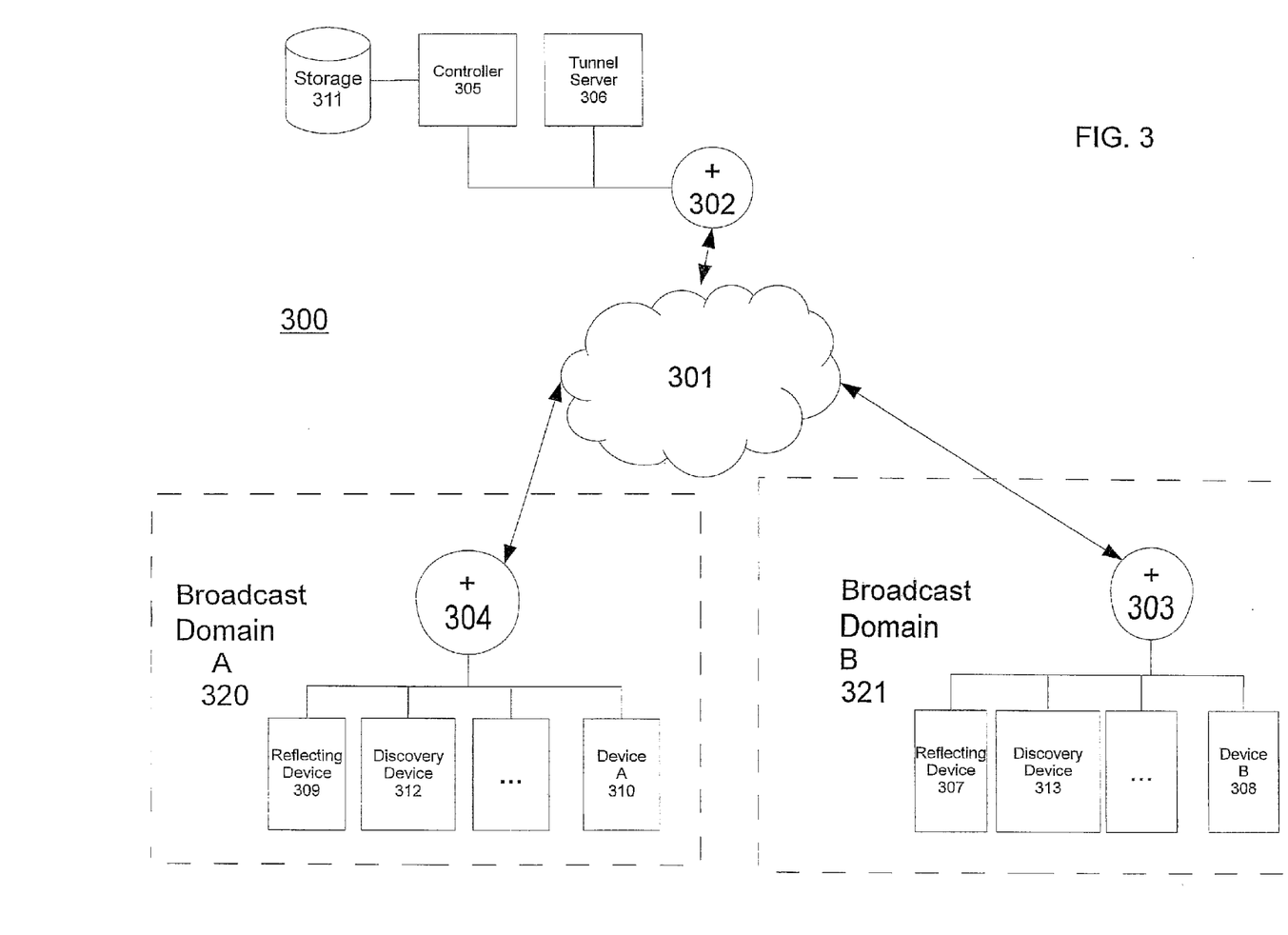
FIG. 3 is a schematic diagram illustrating still another embodiment of communication between broadcast domains.

FIG. 3 is a schematic diagram illustrating still another embodiment 300 of communication between broadcast domains. In one embodiment, routers 304 and 303 may employ network address translation (NAT). NAT if employed in a network may add a layer of additional complexity for some signal packets that are to be transmitted or received. Typically, routers that employ NAT may modify a signal packet by altering a source address of a source device that may be part of a broadcast domain (likewise, a router employing NAT may also modify a destination address). Therefore, a signal packet transmission from a router employing NAT may appear as though the signal packet originated from the router rather than having originated elsewhere. Likewise, network devices on a broadcast domain may have an intervening router, or a similar device performing network address translation, between the broadcast domain and other networks. Therefore, other portions of a network that have other broadcast domains, may not conventionally be accessible to devices operating as part of the other broadcast domains, at least not without some form of network address translation conventionally taking place. Likewise, routers employing NAT also may in some situations not necessarily allow signal packets to traverse a particular broadcast domain if the packets originate from outside the particular broadcast domain.

In one embodiment, respective discovery devices (e.g., 312, 313) may generate respective broadcast domain configurations and may, for example, transmit them to a controller or to a master controller, such as 305, for example, via a router. Respective reflecting devices (e.g., 307, 309) may request from a controller, such as a master controller, respective emulated or generated broadcast domain configurations from other broadcast domains and may emulate the generated broadcast domain configurations via their respective broadcast domains. Likewise, a reflecting device may, instead, request that a controller, for example, instruct a discovery device or a reflecting device to initiate transmission of a generated broadcast domain configuration to the requesting reflecting device. In one embodiment, reflecting device 309 may, for example, request a generated broadcast domain configuration from controller 305 corresponding to broadcast domain B 321, for example. Likewise, reflecting device 307 may request a generated broadcast domain configuration from controller 305 corresponding to broadcast domain A 320.

In one embodiment, devices communicating via broadcast domain A 320, may communicate with devices operating via broadcast domain B 321. In one illustrative embodiment, this may be accomplished via use of a tunnel server 306. A tunnel server may, for example, execute software capable of receiving and sending signal packets from remote network devices in different broadcast domains that may use separate routers, for example. If, for example, the separate routers include a routing table such that signal packets intended to reach another broadcast domain are routed to a tunnel server, such as 306, then, in this example embodiment, as a result, network address translation may be by-passed. Thus, remote network devices may communicate with tunnel server 306 and tunnel server 306 may forward traffic between devices, such as on different broadcast domains.

Thus, for example, if broadcast domain A provides a signal packet A to tunnel server 306, it may be encapsulated. Likewise, if broadcast domain B provides a signal packet B to tunnel server 306, it may be encapsulated. However, in this embodiment, for the signal packet from broadcast domain A 320 and the signal packet from broadcast domain B 321, tunnel server may remove encapsulation (e.g., referred to as termination) to determine where to forward the signal packet and re-encapsulate it for forwarding so that the signal packets may be routed via intermediate network devices. Likewise, in an embodiment, as a few non-limiting illustrative examples, encapsulation may include encryption as well, or may separate encapsulation from termination.

In an embodiment, tunnel server 306 may be controlled at least in part by a controller 305, such as a master controller. For example, a tunnel server may be instructed to forward network transmission signal packets from device A 310 to device B 308, and forward network transmission signal packets from device B 308 to device A 310, in the manner previously described, for an embodiment, for example. This may, for an embodiment, connect device A 310 in broadcast domain A 320 and device B 308 in broadcast domain B 321 by creating an open path for signal packet communications between device A 310 and device B 308; however, without signal packets necessarily being transmitted via a router on a broadcast domain, for example.

As indicated, tunnel server 306 may receive signal packets from devices communicating as part of other broadcast domains. For example, tunnel server 306 may receive signal packets from device A 310 communicating as part of broadcast domain A 320, and also from device B 308 communicating as part of broadcast domain B 321. Tunnel server 306 may receive signal packets from device A 310 and forward the signal packets to device B 308 via an already established connection, for example. Tunnel server 306 may also receive signal packets from device B 308 and forward the signal packets to device A 310 also via an already established connection with device A 310, for example. As indicated, in an embodiment, this may allow device A 310 and device B 308 to communicate without employing a router, or similar network transport layer protocol device, even though routers for broadcast domain 320 and broadcast domain 321 may execute or implement NAT, or employ another or similar address modification technique.

In another embodiment, broadcast domain A 320 may employ a different network protocol than broadcast domain B 321, such as a different network discovery protocol, for example. In one embodiment, a controller, such as controller 305, may translate a generated broadcast domain configuration, such as by modifying network transmission signal packets comprising the generated broadcast domain configuration for broadcast domain A 320 so as to be substantially compatible with or substantially complaint with broadcast domain B 321, such as, for example, its particular network discovery protocol. In another embodiment, a controller may initiate a discovery device or a reflecting device to modify a generated broadcast domain configuration, such as for broadcast domain A 320, for example, so as to be substantially compatible with or substantially compliant with broadcast domain B 321, such as, for example, its particular network discovery protocol. Likewise, rather than being initiated, such as by a controller, perhaps a difference in protocol, such as a network discovery protocol, may be detected, such as by a reflecting device and, without being initiated, the reflecting device may translate features, such as discovery related features, of the generated broadcast domain configuration in an embodiment. For example, in one illustrative embodiment, devices communicating as part of broadcast domain A 320 may perform discovery via WS-Discovery, previously referenced, and devices communicating as part of broadcast domain B 321 may do so via Bonjour, available from Apple Inc., Cupertino, Calif., see, for example, https://developer.apple.com/bonjour/. Thus, a reflecting device may, for example, convert a generated broadcast domain configuration from WS-Discovery to Bonjour for compliance or compatibility within the broadcast domain including the reflecting device.

In another embodiment, a broadcast domain configuration of broadcast domain B 321 may be modified by discovery device 313 so as to communicate additional features as part of a generated broadcast domain configuration. For example, having generated a broadcast domain configuration for broadcast domain B 321, discovery device 313 may include additional features in a modified broadcast domain configuration based at least in part on the generated broadcast domain configuration. For example, in one embodiment, a discovery device, such as 313, may augment a generated broadcast domain configuration. In this context, augmenting refers to adding a feature to the generated broadcast domain configuration that previously was not present, but without necessarily removing an existing feature. As one illustrative example, device names may be modified to indicate communication status. For example, if a machine name of device B were "ComputerB," discovery device 313 of broadcast domain B 321, may augment the name of device B 308 to "ComputerB_offline" thereby indicating its status. In another embodiment, a discovery device may also modify a machine name based at least in part on geographic information, operating system of a host device, a feature of broadcast domain B 321, or other, for example. In one embodiment, augmentation of broadcast domain configuration may be based on a feature of the broadcast domain, such as broadcast domain B 321 in this example, or a feature of a device communicating as part of the broadcast domain, for example. For example, in an illustrative embodiment, devices communicating as part of a broadcast domain, such as broadcast domain A 320, for example, may track states, status or features of devices communicating as part of the broadcast domain, even if some devices may, in one embodiment, no longer be communicating as part of a respective broadcast domain, for example.

In another embodiment, a generated broadcast domain configuration may be digested, such as by a controller, such as controller 305, as an example. In this context, the term digest refers to employing a subset of features of a generated broadcast domain configuration. It is noted that a subset of features of a generated broadcast domain configuration nonetheless comprises a generated broadcast domain configuration, albeit with fewer features, of course. For example, in one embodiment, a generated broadcast domain configuration of broadcast domain B 321 may be modified by controller 305 such that only network devices sharing services may be included in a generated broadcast domain configuration. Thus, in one embodiment, if device B 308 were not sharing services via broadcast domain B 321, device B 308 may not be included in a digested list of devices in a generated broadcast domain configuration transmitted to controller 305, for example. Thus, a digest of a generated broadcast domain configuration may be digested based at least in part on network device names, network device communication status, services available via network devices, and/or network address, to provide a few non-exhaustive illustrative examples.

In another embodiment, if one or more features of a broadcast domain, such as broadcast domain B 321, for example, changes, a discovery device, such as 313, for example, may generate another broadcast domain configuration and may transmit an update of a generated broadcast domain configuration, such as to controller 305 or elsewhere. For example, if a discovery device alters, adds, or removes a feature, such as a service, for example, available via a network device communicating as part of a broadcast domain, a broadcast domain configuration may be generated to update a changed feature, for example.

For example, a discovery device may access network devices via an internet protocol (IP) address, or a media access control (MAC) address. A controller, such as 305, may forward an update of a previously generated broadcast domain configuration to corresponding reflecting devices. Respective reflecting devices may emulate the more recently generated update of the previously generated broadcast domain configuration, for example. In one embodiment, controller 305 may forward an update to a reflecting device or in another embodiment may instruct a discovery device to initiate transmission of an update. In another embodiment, controller 305 may initiate forwarding of an update to a limited number of reflecting devices, for example, for any one of a host of possible reasons, such as compatibility, or for other reasons.

In another embodiment, a generated broadcast domain configuration may be modified based at least in part on one or more detected errors. For example, a discovery device may modify the generated broadcast domain configuration, a reflecting device may modify the generated broadcast domain configuration or a controller, such as a master controller, may modify the generated broadcast domain configuration. For example, if a discovery device, such as 313, transmits a generated broadcast domain configuration describing one or more impossible or infeasible broadcast domain features, a controller, such as controller 305, for example, may detect the one or more impossible or infeasible features, referred to here as error detection, and may modify the generated broadcast domain configuration, referred to here as error correction, to remove the one or more impossible or infeasible features, after being detected. In other embodiments, a discovery device (e.g., 312, 313) may provide correction for a generated broadcast domain configuration. In one embodiment, controller 305 may also provide error detection and correction for a generated broadcast domain configuration. For example, a controller 305 may limit address conflicts between broadcast domain configurations or broadcast domains. As an illustration, if broadcast domain A 304 and broadcast domain B 321, both include a network device named "ComputerC," controller 305 may modify the names of either or both network devices. For example, controller 305 may modify the name of the device of broadcast domain B to "ComputerC_domainB" or may modify the name of the device of broadcast domain to "ComputerC_domainA" so as to limit naming conflicts between devices communicating as part of different broadcast domains. In other embodiments, one or more reflecting devices (e.g., 309, 307) may modify a generated broadcast domain configuration for convenience, political correctness, cultural acceptability, filtering vulgarity, or other reasons, such as based at least in part on features of a broadcast domain, as previously specified, for example.

In an embodiment, a controller, such as controller 206 in FIG. 2, for example, may modify a generated broadcast domain configuration based at least in part on user specified parameters, system specified parameters, management parameters, reliability parameters, performance parameters, any combination thereof, or other parameters. A policy may describe a set of features to modify a generated broadcast domain configuration. These parameters may also include broadcast domain features, such as those previously disclosed, for example. Parameters may also include access permissions. For example, a policy may be such that access to a device A 217 may be restricted, or granted based at least in part on: time(s) of day(s), source(s) of transmission, user name(s), user group association(s), allowable communication(s), license restriction(s), cost considerations, any combination thereof, or other. Thus, controller 206 may modify one or more generated broadcast domain configurations based at least in part on a policy in an embodiment.

In another embodiment, a master controller, for example, may request or initiate a request for one or more broadcast domain configurations from other controllers or other master controllers. Thus, in an embodiment, a master controller may at least partially control multiple controllers, although this is not required. Likewise, an embodiment may employ several master controllers.

Figure 4:
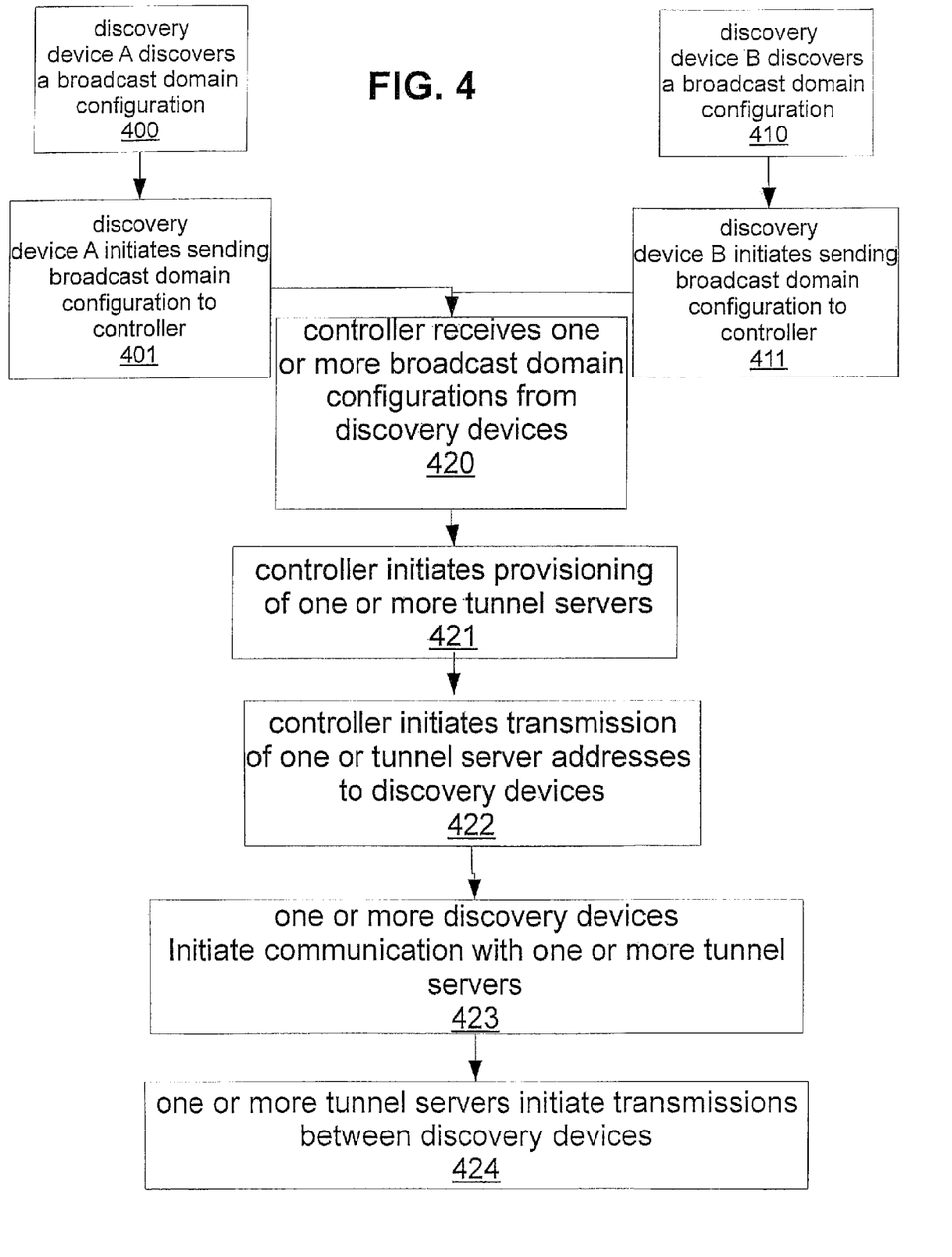
FIG. 4 is a flowchart illustrating an embodiment of a method of communication between broadcast domains.

FIG. 4 is a flowchart illustrating an embodiment of a method of communication between broadcast domains. Of course, claimed subject matter is not limited in scope to the particular order or arrangement of blocks shown. Likewise, additional blocks may be included in an embodiment or blocks depicting one or more operations in place of those shown may be used in an embodiment.

Referring to FIG. 4, discovery devices A and B may reside on separate broadcast domains in an example embodiment. As shown by block 400, discovery device A may discover and generate a broadcast domain configuration without human intervention as part of a broadcast domain, for example. As shown by block 410, discovery device B may likewise discover and generate a broadcast domain configuration as part of a broadcast domain, for example. At block 401, discovery device A may initiate transmission of a generated broadcast domain configuration in the form of signal packets, for example, to a controller or a master controller. At block 410, discovery device B may initiate transmission of a generated broadcast domain configuration in the form of signal packets, for example, to a controller or a master controller. At block 420, a controller may receive one or more generated broadcast domain configurations from one or more discovery devices, such as A and/or B, for example. At block 421, a controller may initiate provisioning of one or more tunnel servers, such as for device A and/or device B, for example. A tunnel server may be implemented in software, firmware, hardware or a combination thereof (other than software per se), as previously explained. For example, a tunnel server may comprise a software application initiated by a controller and executed elsewhere, such as on a separate server, for example; although claimed subject matter is not limited in scope in this respect. In another embodiment, a tunnel server may comprise a network device physically or virtually separate from a controller. At block 422, a controller may initiate transmission of one or more tunnel server addresses to device A and/or to device B, for example. At block 423, discovery devices A and/or B may initiate communication with one or more tunnel servers, for example, via one or more tunnel server addresses, for example. At block 424, one or more tunnel servers may receive signal packets and may forward signal packets, such as between devices, such as A and/or B, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that contains subscription information of a user, and may also contain a contact list of the user. A user may own the computing device or may otherwise be its primary user. A computing device may be assigned an address by a wireless or wired telephony network operator, or an Internet Service Provider (ISP). For example, an address may comprise a domestic or international telephone number, an Internet Protocol (IP) address, or other identifiers. In other embodiments, a communication network may be embodied as a wired network, wireless network, or combination thereof.

A network device may vary in terms of capabilities or features. Claimed subject matter is intended to cover a wide range of potential variations. For example, a network device may include a numeric keypad or a display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, or a display with a high degree of functionality, such as a touch-sensitive color 2D or 3D display, for example.

A network device may include or may execute a variety now known, or to be developed operating systems, or derivatives, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A network device may also include or execute an application to communicate content, such as, for example, textual content, multimedia content, or the like. A computing device may also include or execute an application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A broadcast domain may also be extended to another device communicating via another network via a virtual private network (VPN). To support a VPN, broadcast domain transmissions may be forwarded to the VPN device via another network. A software tunnel may be created between the broadcast domain, and the VPN device. Tunneled traffic may, or may not be encrypted, and a tunneling protocol may be complaint with or compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A broadcast domain may communicate via signal packets, such as in a network of participating digital communications, The broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. The broadcast domain may employ, for example, TCP/IP, UDP, DECnet, NetBEUI, IPX, Appletalk, other, or the like. Versions of the Internet Protocol (IP) may include IPv4 or IPv6, or other, or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although the claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, and/or characteristic in the singular and/or may be used to describe a plurality or some other combination of features, structures and/or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of operating a network including two or more broadcast domains comprising: generating, without human intervention, via a discovery device operable to generate without human intervention a broadcast domain configuration of the broadcast domain that includes the discovery device and operable to transmit without human intervention the broadcast domain configuration to another broadcast domain, a broadcast domain configuration of one of the two or more broadcast domains; transmitting, via the discovery device without human intervention, the broadcast domain configuration to another of the two or more broadcast domains; wherein the broadcast domain configuration received from the one of the two or more broadcast domains comprises a generated specification of one or more hardware, firmware and/or software application features of the one of the two or more broadcast domains; substantially emulating, without human intervention, the broadcast domain configuration received from the one of the two or more broadcast domains, wherein substantially emulating comprises at least one of the following: substantially translating the broadcast domain configuration to be substantially compatible with or to be substantially compliant with the another of the two or more broadcast domains; augmenting the broadcast domain configuration; or transmitting Internet protocol packets via the another of the two or more broadcast domains; and further comprising substantially emulating, without human intervention, via a reflecting device included in the another broadcast domain, the broadcast domain configuration received from the one of the two or more broadcast domains, the reflecting device operable to substantially emulate without human intervention a broadcast domain based at least in part on the broadcast domain configuration.

2. The method of claim 1, and further comprising: generating, without human intervention, via another discovery device operable to generate without human intervention a broadcast domain configuration of the broadcast domain that includes the another discovery device and operable to transmit the broadcast domain configuration to another broadcast domain, a broadcast domain configuration of the another of the two or more broadcast domains; transmitting, via the another discovery device, without human intervention, the broadcast domain configuration to the one of the two or more broadcast domains to the another of the two or more broadcast domains; wherein each of the two or more broadcast domains comprises a set of devices, including associated services and/or support, occupying a local address space in which any device is able to communicate with any other device in the broadcast domain without employing a router.

3. The method of claim 1, and further comprising: updating, without human intervention, the broadcast domain configuration of the one of the two or more broadcast domains in response to a change in the one of the two or more broadcast domains.

4. The method of claim 3, wherein the change comprises: altering without human intervention a service available via the one of the two or more broadcast domains.

5. The method of claim 3, wherein the change comprises: adding or removing without human intervention a device accessible via the one of the two or more broadcast domains.

6. The method of claim 5, wherein accessible includes addressable via an Internet protocol (IP) address.

7. The method of claim 5, wherein accessible includes addressable via a media address control (MAC) address.

8. The method of claim 1, wherein the substantially translating the broadcast domain configuration of the one of the two or more broadcast domains comprises modifying network protocol discovery features of the broadcast domain configuration from a network discovery protocol of the one of the two or more broadcast domains to be substantially compatible with or to be substantially compliant with a network discovery protocol of the another of the two or more broadcast domains.

9. The method of claim 1, wherein the generating the broadcast domain configuration of the one of the two or more broadcast domain configurations comprises identifying one or more virtual devices as part of the broadcast domain.

10. The method of claim 1, wherein the transmitting comprises initiating routing of the broadcast domain configuration of the one of the two or more broadcast domains from the one of the two or more broadcast domains to the another of the two or more broadcast domains.

11. The method of claim 10, wherein the initiating routing comprises transmitting the broadcast domain configuration to one or more routers.

12. The method of claim 11, wherein the transmitting comprises transmitting a wireless signal.

13. The method of claim 1, wherein the transmitting comprises routing the broadcast domain configuration of the one of the two or more broadcast configurations via a wide area network.

14. The method of claim 1, wherein the transmitting comprises communicating the broadcast domain configuration to the another of the two or more broadcast domains via a controller.

15. The method of claim 1, wherein the transmitting comprises communicating the broadcast domain configuration to the another of the two or more broadcast domains in response to one or more signals from a controller.

16. The method of claim 14, wherein the communicating the broadcast domain configuration via a controller takes place with or without being initiated by signaling from the controller.

17. The method of claim 1, wherein the transmitting to the another of the two or more broadcast domains comprises transmitting a portion of the broadcast domain configuration of the one of the two or more broadcast domains.

18. The method of claim 17, wherein the transmitting a portion of the broadcast domain configuration of the one of the two or more broadcast domains comprises transmitting a digest of the broadcast domain configuration of the one of the two or more broadcast domains via a controller implementing a policy.

19. The method of claim 18, wherein the policy comprises at least one of the following: user specified parameters, system specified parameters, management parameters, reliability parameters, performance parameters or any combination thereof.

20. The method of claim 19, wherein user specified parameters include access permissions.

21. The method of claim 1, wherein the generating the broadcast domain configuration of the one of the two or more broadcast domains comprises: assembling without human intervention a list of devices capable of communicating via the one of the two or more broadcast domains; and assembling without human intervention a list of services available via the one of the two or more broadcast domains.

22. The method of claim 1, wherein the generating the broadcast domain configuration of the one of the two or more broadcast domains comprises: monitoring signal packets being communicated via the one of the two or more broadcast domains.

23. The method of claim 22, wherein the monitoring signal packets includes transmitting discovery packets via the one of the two or more broadcast domains, and monitoring responses via the one of the two or more broadcast domains.

24. The method of claim 22, wherein the monitoring signal packets comprises actively probing without human intervention the one of the two or more broadcast domains.

25. The method of claim 22, wherein the monitoring signal packets comprises port scanning without human intervention one or more devices addressable via the one of the two or more broadcast domains.

26. The method of claim 1, wherein the generating the broadcast domain configuration of the one of the two or more broadcast domains comprises: querying without human intervention a device comprising a server capable of maintaining a directory of the broadcast domain configuration.

27. The method of claim 1, wherein the two or more broadcast domains comprises more than two broadcast domains.

28. A method of managing a plurality of broadcast domains comprising: receiving at a controller a respective plurality of broadcast domain configurations from a first subset of the plurality of broadcast domains, wherein each of the broadcast domains comprise a set of devices, including associated services and/or support, occupying a local address space in which any device is able to communicate with any other device in the broadcast domain without employing a router, the broadcast domain configurations having been generated without human intervention, wherein the broadcast domain configurations received comprise a generated specification of one or more hardware, firmware and/or software application features of the broadcast domains; transmitting from the controller at least one of the plurality of broadcast domain configurations to a second subset of the plurality of broadcast domains; wherein the broadcast domain configuration received from the first subset comprises a generated specification of one or more hardware, firmware and/or software application features of the one of the two or more broadcast domains; substantially emulating, without human intervention, the broadcast domain configuration received from the first subset, wherein substantially emulating comprises at least one of the following: substantially translating the broadcast domain configuration to be substantially compatible with or to be substantially compliant with the another of the second subset; augmenting the broadcast domain configuration; or transmitting Internet protocol packets to the second subset; and further comprising substantially emulating, without human intervention, via a reflecting device included in the second subset, the broadcast domain configuration received from the controller, the reflecting device operable to substantially emulate without human intervention a broadcast domain based at least in part on the broadcast domain configuration received.

29. The method of claim 28, and further comprising: digesting without human intervention at least one of the plurality of broadcast domain configurations before the transmitting the at least one of the plurality of broadcast domain configurations.

30. The method of claim 28, and further comprising: augmenting without human intervention at least one of the plurality of broadcast domain configurations before the transmitting at least one of the plurality of broadcast domain configurations.

31. The method of claim 28, and further comprising: storing at least one of the plurality of broadcast domain configurations.

32. The method of claim 31, wherein the storing comprises writing the at least one of the plurality of broadcast domain configurations to a memory device.

33. A system comprising: at least two broadcast domains, wherein one broadcast domain of the at least two broadcast domains includes a discovery device, and another broadcast domain of the at least two broadcast domains includes a reflecting device; the discovery device operable to generate without human intervention a broadcast domain configuration of the broadcast domain that includes the discovery device and operable to transmit the broadcast domain configuration to another broadcast domain; and the reflecting device operable to emulate without human intervention a broadcast domain based at least in part on a broadcast domain configuration; wherein the broadcast domain configuration to be received from the one of the two or more broadcast domains to comprise a generated specification of one or more hardware, firmware and/or software application features of the one of the two or more broadcast domains; wherein to emulate, without human intervention, to comprise at least one of the following: to substantially translate the broadcast domain configuration to be substantially compatible with or to be substantially compliant with the another of the two or more broadcast domains; to augment the broadcast domain configuration; or to transmit Internet protocol packets via the another of the two or more broadcast domains; and wherein to emulate further to comprise: to substantially emulate via a reflecting device to be included in the another broadcast domain, the broadcast domain configuration to be received from the one of the two or more broadcast domains, the reflecting device to be operable to substantially emulate without human intervention a broadcast domain based at least in part on the broadcast domain configuration to be received.

34. The system of claim 33, wherein each of the at least two broadcast domains comprises a set of devices, including associated services and/or support, occupying a local address space in which any device is able to communicate with any other device in the broadcast domain without employing a router; and further comprising a controller, wherein the controller is capable of receiving signal packets from both the discovery device and the reflecting device, wherein the discovery device signal packets are to at least partially comprise a broadcast domain configuration generated without human intervention.

35. The system of claim 34, wherein the discovery device comprises a network device capable of communicating as part of a broadcast domain to discover features of the particular broadcast domain without human intervention to generate a broadcast domain configuration of the particular broadcast domain which includes the discovery device, wherein the broadcast domain configuration to comprise a generated specification of one or more hardware, firmware and/or software application features of the broadcast domain, and wherein the controller comprises a master controller.

36. The system of claim 33, and further comprising:
a plurality of respective networks wherein at least one of the respective networks includes the at least two broadcast domains, and further comprising a controller wherein the controller is capable of receiving signal packets from a respective discovery device and is further capable of transmitting the signal packets to a respective reflecting device.

37. The system of claim 36, wherein the signal packets to comprise a broadcast domain configuration generated without human intervention.

38. The system of claim 37, wherein the controller is capable of providing one or more instructions to a discovery device of one the plurality of respective networks to transmit the broadcast domain configuration to a reflecting device of another of the plurality of respective networks.

39. The system of claim 37, wherein the controller is further capable of digesting the broadcast domain configuration without human intervention.

40. the system of claim 37, wherein the controller is further capable of augmenting the broadcast domain configuration without human intervention.

41. The system of claim 37, wherein the controller is further capable of storing the broadcast domain configuration.

42. The system of claim 33, further comprising at least one router to route between the at least two broadcast domains.

43. An apparatus comprising: a network device, the network device including a capability to manage one or more broadcast domains, wherein each of the one or more broadcast domains comprises a set of devices, including associated services and/or support, occupying a local address space in which any device is able to communicate with any other device in the broadcast domain without employing a router; and including a capability to transmit a broadcast domain configuration generated without human intervention of one of the one or more broadcast domains to another broadcast domain of the one or more broadcast domains wherein the broadcast domain configuration to comprise a generated specification of one or more hardware, firmware and/or software application features of the of one of the one or more broadcast domains broadcast domains; wherein the broadcast domain configuration to be received from the one of the two or more broadcast domains to comprise a generated specification of one or more hardware, firmware and/or software application features of the one of the two or more broadcast domains; wherein to emulate, without human intervention, to comprise at least one of the following: to substantially translate the broadcast domain configuration to be substantially compatible with or to be substantially compliant with the another of the two or more broadcast domains; to augment the broadcast domain configuration; or to transmit Internet protocol packets to the another broadcast domain; and wherein to emulate further to comprise: to substantially emulate via a reflecting device to be included in the another broadcast domain, the broadcast domain configuration to be received from the network device, the reflecting device to be operable to substantially emulate without human intervention a broadcast domain based at least in part on the broadcast domain configuration to be received.

44. The apparatus of claim 43, wherein the network device comprises a controller.

45. The apparatus of claim 44, and further comprising another network device, the another network device including a capability to generate, without human intervention, a broadcast domain configuration of one of the one or more broadcast domains.

46. The apparatus of claim 45, and further comprising yet another network device, the yet another network device including a capability to substantially emulate, without human intervention, the broadcast domain configuration of one of the one or more broadcast domains.

47. the apparatus of claim 46, wherein the yet another network device is capable to receive the broadcast domain configuration from the another network device.

48. The apparatus of claim 45, wherein the controller is at least in part capable to affect the operation of the another network device.

49. An article comprising: a non-transitory storage medium having stored thereon instructions executable by a processor: to generate, without human intervention, via a discovery device operable to generate without human intervention a broadcast domain configuration of the broadcast domain to include the discovery device and operable to transmit without human intervention the broadcast domain configuration to another broadcast domain, a broadcast domain configuration of one of two or more broadcast domains; wherein the broadcast domain configuration to be received from the one of the two or more broadcast domains to comprise a generated specification of one or more hardware, firmware and/or software application features of the one of the two or more broadcast domains; wherein to substantially emulate, without human intervention, to comprise at least one of the following: to substantially translate the broadcast domain configuration to be substantially compatible with or to be substantially compliant with the another of the two or more broadcast domains; to augment the broadcast domain configuration; or to transmit Internet protocol packets via the another of the two or more broadcast domains; and wherein to substantially emulate to further comprise: to substantially emulate, without human intervention, via a reflecting device to be included in the another broadcast domain, the broadcast domain configuration to be received from the one of the two or more broadcast domains, the reflecting device to be operable to substantially emulate without human intervention a broadcast domain based at least in part on the broadcast domain configuration to be received; and to transmit, via the discovery device, without human intervention, the broadcast domain configuration to another of the two or more broadcast domains.

50. The article of claim 49, wherein the storage medium has stored thereon further instructions executable by a processor to: generate, without human intervention, via another discovery device operable to generate without human intervention a broadcast domain configuration of the broadcast domain to include the another discovery device and operable to transmit the broadcast domain configuration to another broadcast domain, a broadcast domain configuration of the another of the two or more broadcast domains; transmit, via the another discovery device, without human intervention, the broadcast domain configuration to the one of the two or more broadcast domains to the another of the two or more broadcast domains; wherein each of the two or more broadcast domains comprises a set of devices, including associated services and/or support, occupying a local address space in which any device is able to communicate with any other device in the broadcast domain without employing a router.

51. The article of claim 49, wherein the storage medium has stored thereon further instructions executable by a processor to: update, without human intervention, the broadcast domain configuration of the one of the two or more broadcast domains in response to a change in the one of the two or more broadcast domains.

52. An article comprising: a storage medium having stored thereon instructions executable by a processor: to transmit from a controller at least one of a plurality of received broadcast domain configurations to at least one broadcast domain, wherein the at least one broadcast domain comprises a set of devices, including associated services and/or support, occupying a local address space in which any device is able to communicate with any other device in the broadcast domain without employing a router; and wherein the at least one broadcast domain configuration to comprise a generated specification of one or more hardware, firmware and/or software application features of the at least one broadcast domains broadcast domain; wherein the broadcast domain configuration to be received from the controller to comprise a generated specification of one or more hardware, firmware and/or software application features of the one of the two or more broadcast domains; and to emulate, without human intervention, to comprise at least one of the following: to substantially translate the broadcast domain configuration to be substantially compatible with or to be substantially compliant with the another of the two or more broadcast domains; to augment the broadcast domain configuration; or to transmit Internet protocol packets to the another of the two or more broadcast domains; and wherein to emulate further to comprise: to substantially emulate via a reflecting device to be included in the another broadcast domain, the broadcast domain configuration to be received from the controller, the reflecting device to be operable to substantially emulate without human intervention a broadcast domain based at least in part on the broadcast domain configuration to be received.

53. The article of claim 52, wherein the storage medium has stored thereon further instructions executable by a processor to: augment, without human intervention, the at least one of the plurality of received broadcast domain configurations before transmitting the at least one of the plurality of received broadcast domain configurations.

54. the article of claim 52, wherein the storage medium has stored thereon further instructions executable by a processor to: store the at least one of the plurality of received broadcast domain configurations.

55. The system of claim 35, wherein the to be generated specification of one or more hardware, firmware and/or software application features of the broadcast domain to include one or more IP addresses and one or more host names.

56. The method of claim 1, wherein the generated specification of one or more hardware, firmware and/or software application features of the broadcast domain includes one or more IP addresses and one or more host names.

\* \* \* \* \*